United States Patent [19]
Takeuchi

[11] Patent Number: 5,369,506
[45] Date of Patent: Nov. 29, 1994

[54] CIRCUIT ARRANGEMENT FOR SELECTING AN IMAGE DATA CORRECTION SCHEME, WRITING THE CORRECTION SCHEME TO A CORRECTION TABLE AND CORRECTING IMAGE DATA GRADATION

[75] Inventor: Yoshihisa Takeuchi, Uji, Japan

[73] Assignee: Murata Kikai Kabushiki Kaisha, Kyoto, Japan

[21] Appl. No.: 38,360

[22] Filed: Mar. 26, 1993

[30] Foreign Application Priority Data

Apr. 2, 1992 [JP] Japan .................................. 4-080978

[51] Int. Cl.[5] ............................................... H04N 1/40
[52] U.S. Cl. ..................................... 358/455; 358/460; 358/458
[58] Field of Search ............... 358/444, 460, 458, 456, 358/455, 523, 521, 534, 298; 395/109

[56] References Cited

U.S. PATENT DOCUMENTS 4,805,013 2/1989 Dei et al. .............................. 358/523
4,972,500 11/1990 Ishii et al. ............................ 358/458

FOREIGN PATENT DOCUMENTS 0234809 9/1987 European Pat. Off. .

Primary Examiner—Scott A. Rogers
Attorney, Agent, or Firm—Spensley Horn Jubas & Lubitz

[57] ABSTRACT

A number of kinds of gradation correction data is prepared beforehand, and when the type of a facsimile machine is specified, a host CPU selects among the gradation correction data some gradation correction data in accordance with the type of the facsimile machine. Then, the selected gradation correction data are written into the RAM to make a gradation correction table optimum for the type of the facsimile machine. When the gradation correction data are written into the RAM, addresses of these data are determined in accordance with pixel signal levels of image data to be scanned. Therefore, when the image data is scanned, correction data which are stored at addresses corresponding to the pixel signal levels of the image data are successively output from the RAM and the gradations of respective segments of the image data are corrected with the respective correction data.

7 Claims, 4 Drawing Sheets

CIRCUIT ARRANGEMENT FOR SELECTING AN IMAGE DATA CORRECTION SCHEME, WRITING THE CORRECTION SCHEME TO A CORRECTION TABLE AND CORRECTING IMAGE DATA GRADATION

BACKGROUND OF THE INVENTION

1. Technical Field

The present invention relates to a circuit arrangement For correcting a gradation of image data adapted, for example, For a facsimile machine.

2. Background Art

Recent facsimile machines are provided with a circuit arrangement for adjusting the white/black (or bright-/dark) gradation of image data obtained by scan-reading a manuscript. Generally, this type of circuit arrangement can adjust the gradation of image data like human eyes.

Conventionally, the image data obtained by a scanner is processed into a pixel signal and this pixel signal is sent to a binary coding circuit. The gradation adjusting circuit adjusts the pixel signal level in a similar manner as human eyes do before the pixel signal is transferred to the binary coding circuit. "Similar manner as human eyes do" means that the darkness of a dark segment of the pixel signal is emphasized whereas the brightness of a bright segment of the pixel signal is not emphasized.

When the gradation adjusting circuit is incorporated in a facsimile machine, a particular ROM is required for each scanner of the facsimile machine since optimum data for the correcting of the image data gradation vary with the type of scanner.

Therefore, if a single gradation correcting circuit should cope with all kinds of facsimile machine, the ROM of the gradation correcting circuit must be able to store a large variety of correction data. Otherwise, a number of ROMs should be prepared, each ROM being adapted to be optimum for a particular type of scanner, and one of the ROMs is selected and put into the facsimile machine when an designer knows which type of scanner is incorporated in the facsimile machine. In this case, the structure of the image processing circuit should be changed in accordance with the type of the scanner and this raises manufacturing cost.

SUMMARY OF THE INVENTION

An object of the present invention is to provide an image data gradation correction circuit which eliminates the necessity of changing the structure of image processing circuit even if the characteristics of image reader/scanner of a facsimile machine changes, while always providing optimum gradation correction data in the form of correction data table.

According to one aspect of the present invention, there is provided a circuit arrangement for correcting the gradation of image data wherein gradation correction data specified by a host CPU among beforehand-prepared various kinds of gradation correction data are successively written into a RAM with addresses, which correspond to pixel signal levels of image data to be scan-read, being specified, so as to make a gradation correction table in the RAM.

A number of kinds of gradation correction data is prepared beforehand, and when the type of the facsimile machine is specified, the host CPU selects among the gradation correction data some gradation correction data in accordance with the type of the facsimile machine. Then, the selected gradation correction data are written into the RAM to make a gradation correction table optimum for the type of the facsimile machine.

When the gradation correction data are written into the RAM, addresses of these data are determined in accordance with pixel signal levels of image data to be scanned. Therefore, when the image data is scanned, correction data which are stored at addresses corresponding to the pixel signal levels of the image data are successively output from the RAM and the gradations of respective segments of the image data are corrected with the respective correction data.

DETAILED DESCRIPTION OF THE PREFERRED EMBODIMENTS

Figure 1:
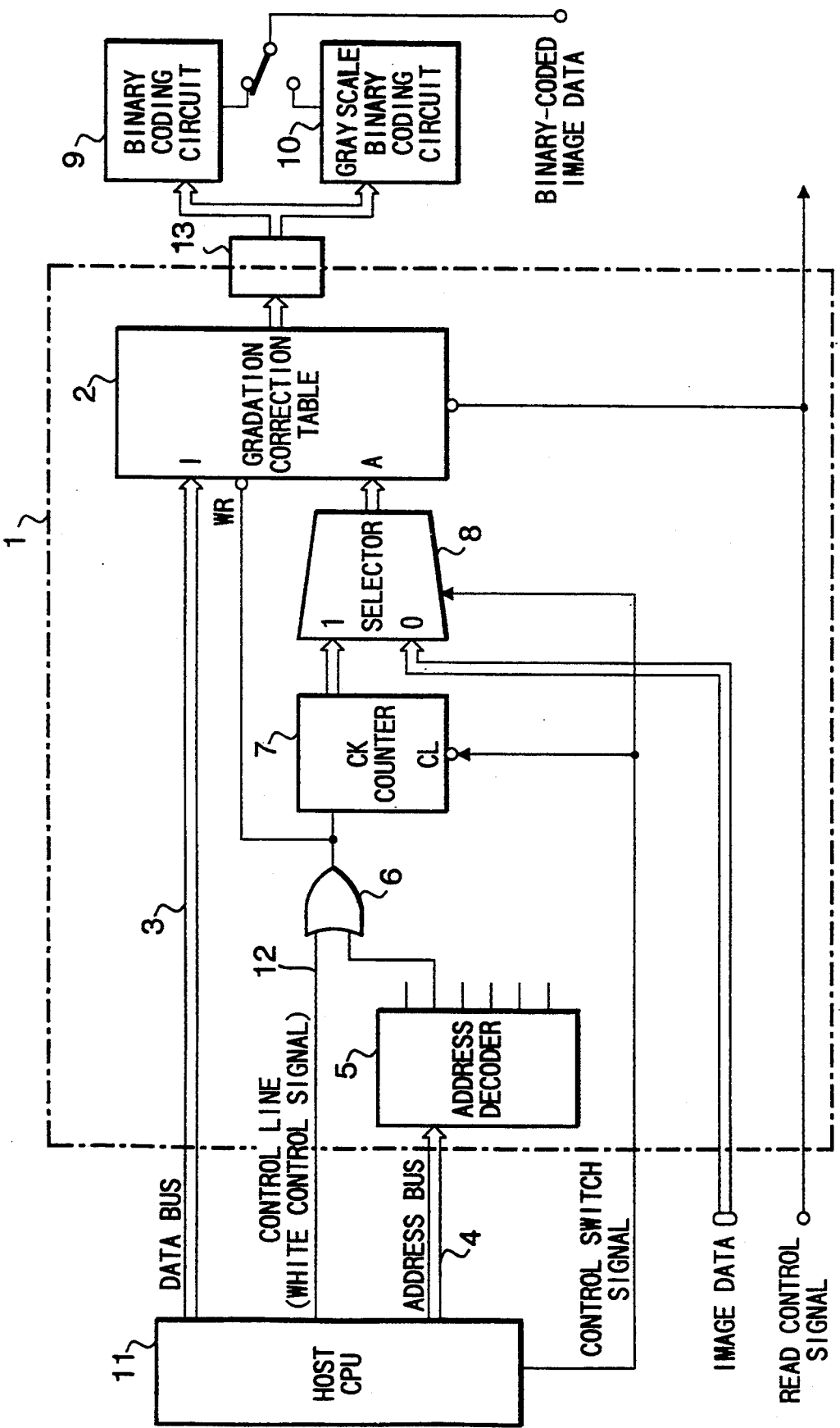
FIG. 1 shows a block diagram of gradation correction circuit arrangement according to the present invention.

Now, a preferred embodiment of the present invention will be described with reference to the accompanying drawings.

A gradation correction circuit 1 includes a gradation correction table 2 comprised of RAM and other elements. The gradation correction circuit 1 may be located in a signal processing unit (CPU or the like) which is generally contained in a facsimile machine (not shown) as a common element or located between a host CPU 11, which is incorporated in the facsimile machine and a binary coding circuit 9 or a gray scale binary coding circuit 10.

The gradation correction table 2 and the host CPU 11 are connected with each other by a data bus 3 for transmitting data, an address bus 4 for specifying the address of the table, a control line 12 for transmitting various control signals and other lines.

An address decoder 5, an OR gate 6, a counter 7, a selector 8 and other elements are connected with the address bus 4. The counter 7 is used to count a write control signal supplied to the gradation correction table 2. The selector 8 is used to switch a state in which the gradation correction data is stored into the gradation correction table 2 from the host CPU 11 and a state in which the pixel signal of the scanned image data is input to the gradation correction table 2 to perform the gradation correction.

The host CPU 11 stores various kinds of correction data in its external memory, for example, and when the type of the facsimile machine is specified, the optimum gradation correction data for the facsimile machine is selected from those in the external memory of the host CPU 11.

Each gradation correction data is a digital signal. The gradation correction data are stored in the external memory in the order of the gradation of data to which the correction data is applied.

Figure 2:
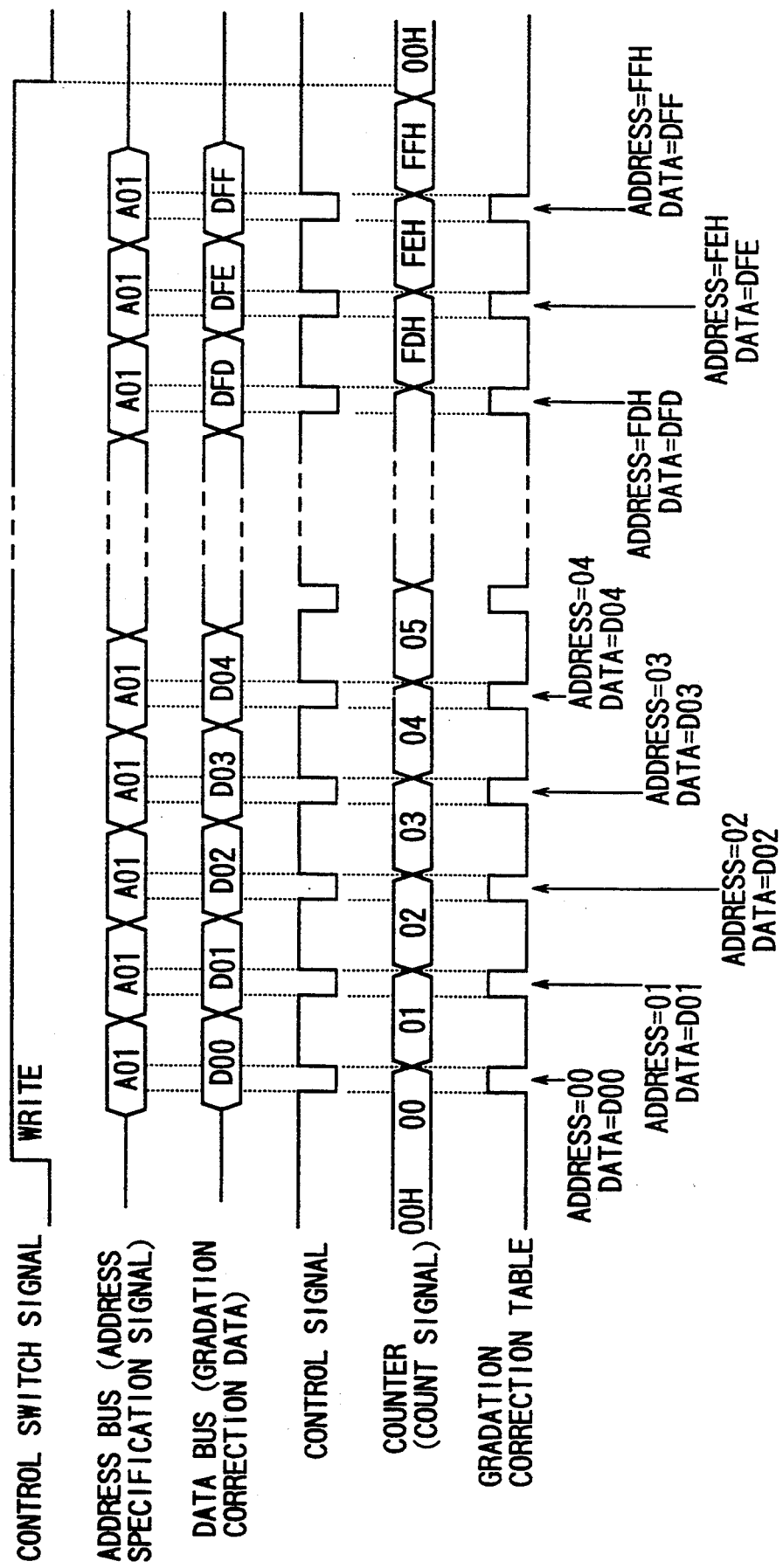
FIG. 2 shows a time chart when gradation correction data is transmitted to a gradation correction table from a host computer (CPU)

FIG. 2 is a time chart showing a fundamental operation of selected gradation correction data being stored in the gradation correction table 2. This time chart will be explained with FIG. 1.

When a control signal which commands the writing of the gradation correction data is output from a signal processor of a facsimile machine (not shown), the selector 8 connects the counter 7 with the gradation correction table 2.

The host CPU 11 outputs an address specification signal to the address bus 4 and a write control signal controlling the writing timing to the control line 12. At this time, the counter 7 counts how many times the address signals and the write control signals are output. If the gradation correction data is represented in the form of 8-bit, for example, the gradation correction values (D00-DFF) of the selected gradation correction data are subsequently stored into the gradation correction table 2 via the data bus 3.

In the gradation correction table 2, a gradation correction value (D00) to be applied to data having the highest gradation is written into an address 00H (the address 00H is obtained by the decoding operation by the address decoder 5), a gradation correction value (D01) to be applied to data having the second highest gradation is written into an address 01H and similar operation is continuously performed to remaining correction data. The last address is FFH and a gradation correction value (DFF) to be applied to data having the lowest gradation is written into the address FFH to complete the writing operation of gradation correction data into the gradation correction table 2.

Meanwhile, the address in the foregoing description is an address added to the RAM 2 (the address output from the CK counter 7). If the address viewed From the CPU 11 is AOH, the address of the address bus 4 output from the CPU 11 is fixed to AOH.

Figure 3:
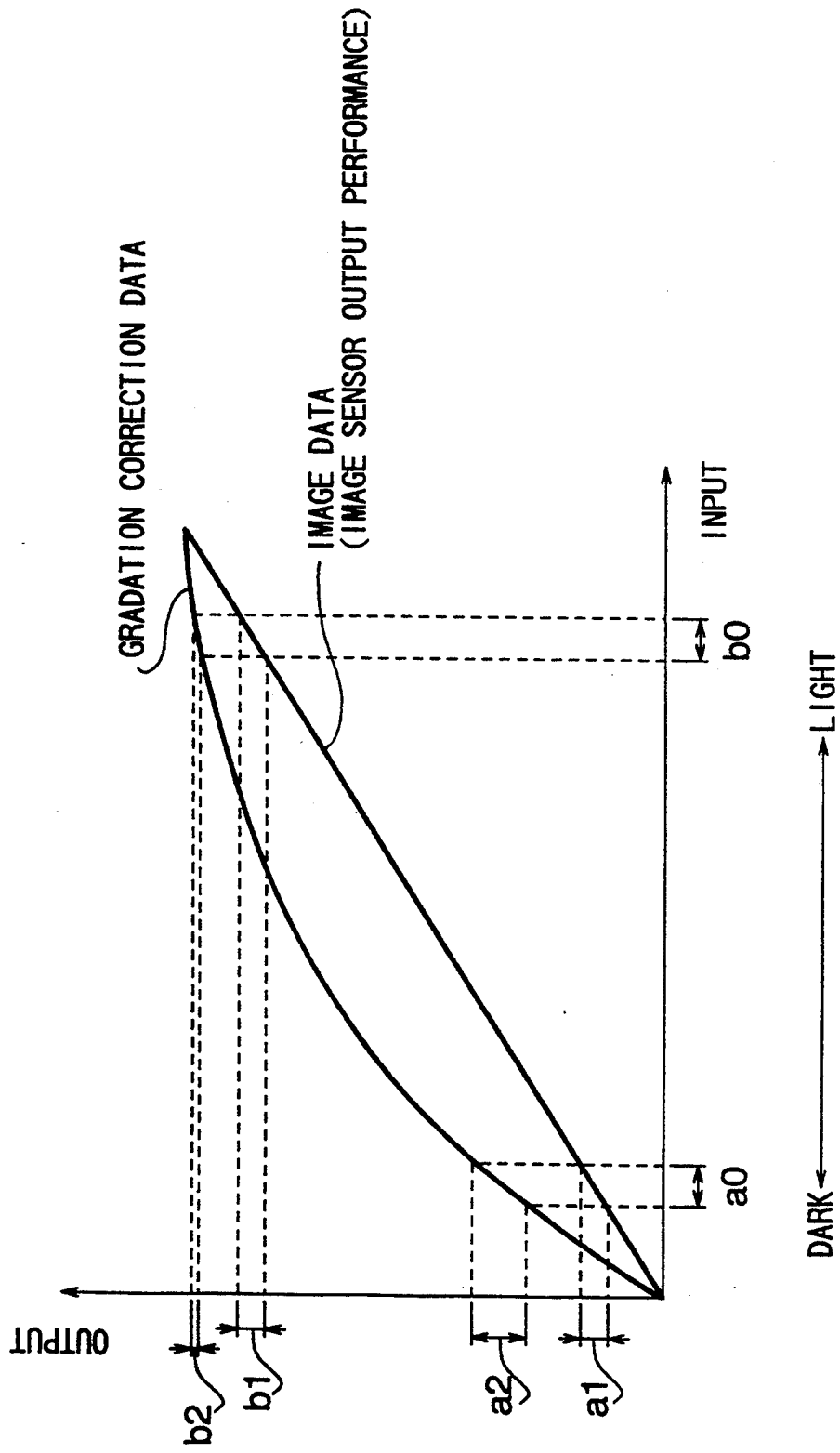
FIG. 3 shows the relation between inputs and outputs of image data scanned by an image pickup (sensor) element and gradation correction data.

Referring now to FIG. 3, the image data obtained by the scanning operation by means of the image pickup (sensor) element such as CCD has a linear input-output relation, but the gradation correction data has an upwardly curved input-output relation since the respective gradation correction values (D01-DFF) are determined in accordance with sensitivity or characteristics of human eyes. Therefore, if the pixel signal has a high gradation (left side on the horizontal axis of the graph of FIG. 3), the output difference a1 from the image pickup clement, which corresponds to the input difference a0, is converted to a larger output difference a2 in the gradation correction curve. On the other hand, if the pixel signal has a low gradation (right side on the horizontal line of the graph), the output difference b1 from the image pickup element, which corresponds to the input difference b0, is converted to a smaller output difference b2 in the correction curve.

Figure 4:
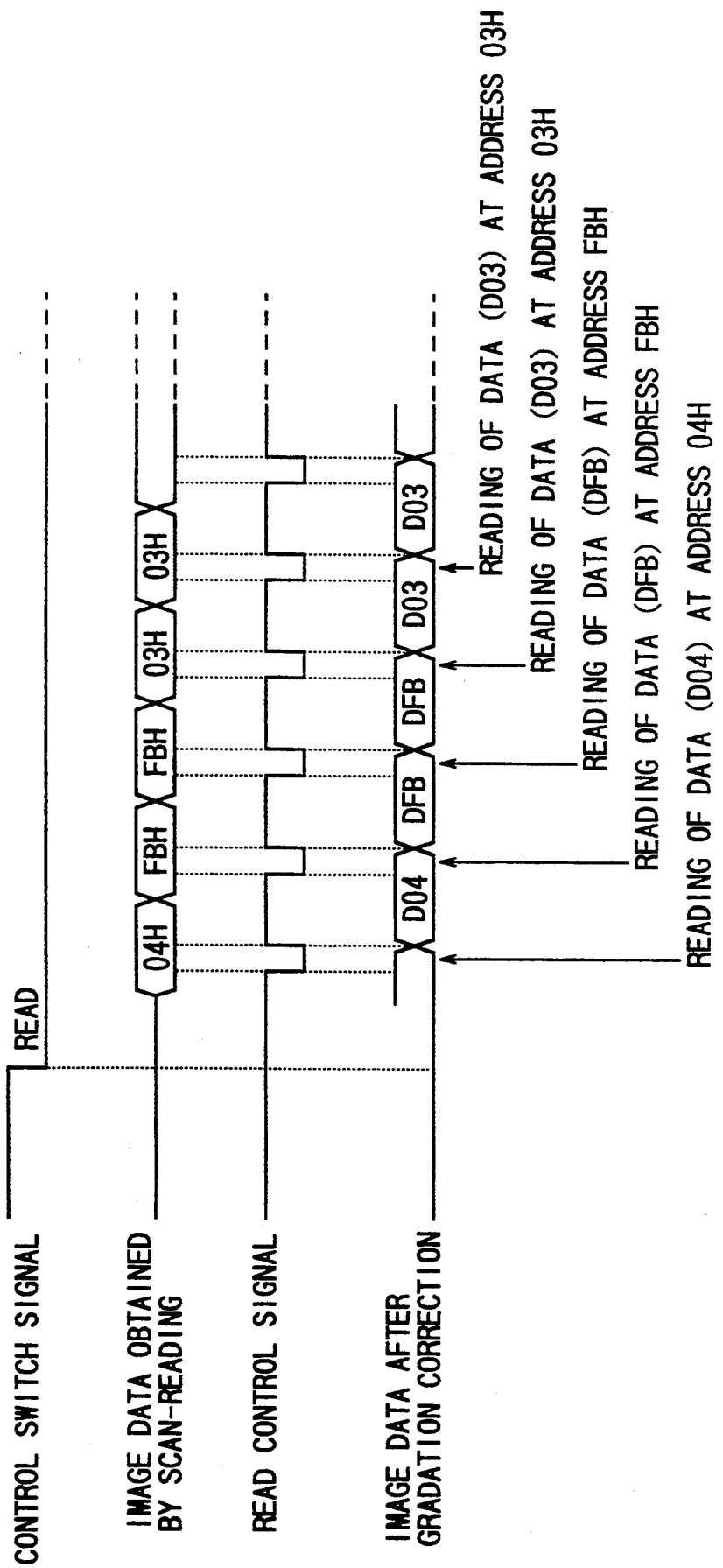
FIG. 4 is a time chart when the gradation correction data written into the gradation correction table is read as the image data scanning proceeds.

Referring to FIG. 4, illustrated In the form of time chart is a fundamental process of the gradation correction data written in the gradation correction table 2 being read upon the scanning of the image data. The process of FIG. 4 will be also explained with FIG. 1.

When the image data is scan-read by the image reader (not shown) of the facsimile machine, for example, a control switch signal to cause the reading of the gradation correction data output to the selector 8 from the CPU 11 and the selector 8 is switched by this signal. Upon the switching of the selector 8, the image data is added to the address input A of the RAM 2.

Then, the host CPU 11 is synchronized with the read control signal output from the signal processor (not shown) of the facsimile machine while the address data corresponding to the signal level of each pixel signal of the image data is being specified. When a before-correction-image data is added to the correction table 2 as an address, the data stored at this address is outputted as the corrected data.

For example, a gradation correction value (e.g., 08H) of D04 which is written in an address of the gradation correction table 2 (this address corresponds to the address data 04H) is read out. The original pixel signal 04H is replaced by the pixel signal 08H upon the gradation correction.

These correction values, which are obtained by the above replacement, are latched by a latch 13 as a series of after-gradation-correction image-data, and output to the binary coding circuit 9 or the half tone binary coding circuit 10.

As understood from the above, a plurality of gradation correction data are prepared beforehand and a group of optimum gradation correction values is selected from the tables when the type of the facsimile machine to be used is known. Therefore, the group of optimum correction values is selected in accordance with the type of image reader of the facsimile machine and the correction data table is made with these optimum correction values.

It is not necessary to touch the image processing circuit to provide such an advantage. Adding the gradation correction circuit of the present invention to an existing image processing circuit is enough.

We claim:

1. A method of making a correction data table used by a circuit arrangement correcting a gradation of image data, the circuit arrangement being used with a facsimile machine having a scan-reading device, the scan-reading device scan-reading image data on a document, the image data consisting of plurality of data segments, comprising the steps of:
    (A) storing various kinds of gradation correction data into a first data storage device;
    (B) selecting a group of gradation correction data among the various kinds of gradation correction data in accordance with the type of the scan-reading device;
    (C) determining addresses of the selected gradation correction data in the first storage means in accordance with the pixel signal levels of the data segments of the scan-read image data; and
    (D) storing the selected gradation correction data into a second data storage device, so as to make the data correction table.

2. A system for making a correction data table used by a circuit arrangement correcting a gradation of image data, the circuit arrangement being used with a facsimile machine having a scan-reading device, the scan-reading device scan-reading image data on a document, the image data consisting of plurality of data segments, comprising:
    first data storage means for storing various kinds of gradation correction data;
    means for selecting a group of gradation correction data among the various kinds of gradation correction data in accordance with the type of the scan-reading device;
    second data storage means for storing the selected gradation correction data;
    means for determining addresses of the selected gradation correction data in the first storage means in accordance with the pixel signal levels of the data segments of the scan-read image data; and means for storing the gradation correction data of the group into the second data storage means using the addresses, so as to make the data correction table.

3. The system of claim 2, wherein the second data storage means includes a RAM.

4. The system of claim 3, wherein the first data storage means is an external memory attached to a host CPU of the facsimile machine.

5. The system of claim 4, wherein the gradation correction data is a digital signal.

6. The system of claim 5, wherein the scan-reading devices includes a CCD.

7. The system of claim 6, wherein the gradation correction data has an input-output relation similar to human eyes.

* * * * *